May 25, 1926.

H. STEINHART

DYNAMO ELECTRIC MACHINE

Filed Nov. 17, 1925

1,586,390

Inventor
Hermann Steinhart
by Steward & McKay
his attorneys

Patented May 25, 1926.

1,586,390

UNITED STATES PATENT OFFICE.

HERMANN STEINHART, OF STUTTGART, GERMANY, ASSIGNOR TO ROBERT BOSCH AKTIENGESELLSCHAFT, OF STUTTGART, GERMANY.

DYNAMO-ELECTRIC MACHINE.

Application filed November 17, 1925. Serial No. 69,663.

This invention relates to a dynamo-electric machine intended for use especially in connection with the electric installations on power vehicles. Generally the rotor of such dynamo-electric machines is supported in two bearing brackets secured to the ends of the stator-casing. With machines of the type in question the connecting terminals, the brushes, the regulating and switching devices, and the like are, in most cases, attached to that bearing bracket which is located nearest to the current delivering member, and said parts are protected by a cap from being affected detrimentally by exterior causes. The said parts are, however, still exposed to the dust produced by the carbon brushes, and the object proper of the present invention is to protect the said parts also from this dust; for this purpose the bearing bracket mentioned which is pressed in known manner of a piece of sheet-iron is now so modified as to form a closed member which is provided with windows for affording access to the brushes. Besides, said bearing bracket is, for the purpose of saving space and from reasons of strength, so shaped as to enclose said current delivering member as closely as possible, as is all more fully described hereinafter.

Figure 1:
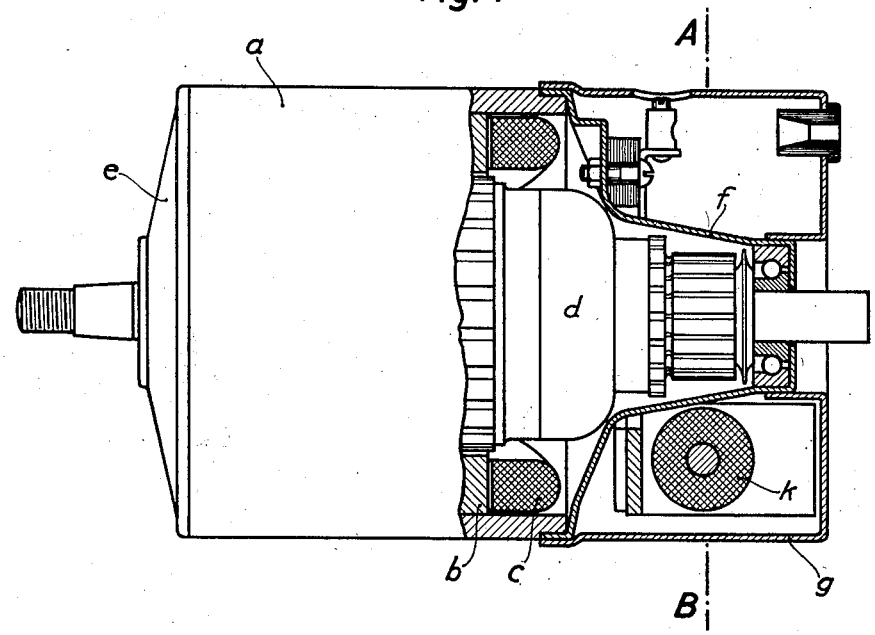
Figure 2:
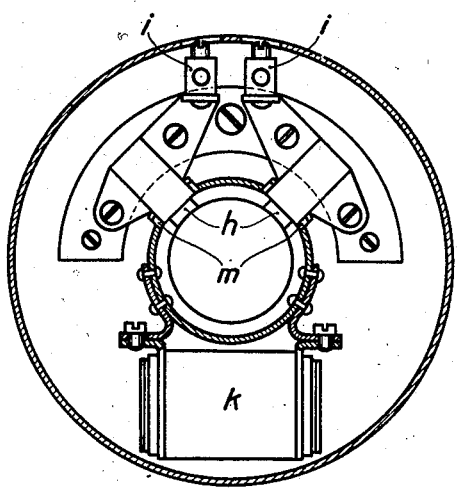

My invention is illustrated diagrammatically and by way of example in the accompanying drawing in which Figure 1 is partly a side-view of the stator and partly a side-view of the rotor of the improved dynamo-machine, the casing and the jacket being partly removed in order to show the interior parts, and Figure 2 is a cross-section in line A—B of Fig. 1.

On the drawing $a$ denotes the pole casing in which are housed the poles $b$ with their coils $c$. $d$ denotes the armature which is supported on two bearing brackets $e$ and $f$ affixed to the pole casing $a$. That bearing bracket which is located on the commutator side surrounds the commutator closely and forms a kind of neck whereby the respective bearing bracket is stayed securely, whereas the space between this bracket and the cover is rendered pretty large even if the protective cover $g$ is small. That space encloses the brushes $h$ with their holders, the connecting terminals $i$, and the regulating and switching device $k$. The bearing bracket $f$ is provided with windows $m$ through which the brushes extend unimpededly, but no other apertures exist near the commutator so that no brush dust can find access to the parts affixed to the said bearing bracket.

I claim:

1. A dynamo-electric machine, intended for use especially in connection with the starting and illuminating installation on power-vehicles, and comprising, in combination, a stator-casing and an armature therein, two bearing brackets supporting said armature; a commutator forming part of the said armature; brushes being in contact with the said commutator; that bearing bracket located nearest to said commutator being pressed of sheet-metal and so shaped and arranged as to surround and enclose the said commutator as closely as possible, and provided with window-forming apertures so located as to fit to the position of the brushes, substantially as, and for the purpose, set forth.

2. A dynamo-electric machine, intended for use especially in connection with the starting and illuminating installation on power-vehicles, and comprising, in combination, a stator-casing and an armature therein, two bearing brackets supporting said armature; a commutator forming part of the said armature; brushes being in contact with the said commutator; a regulating and switching device; said brushes and said regulating and switching device being fastened to that bearing bracket located nearest to said commutator, the said bearing bracket being pressed of sheet-metal and being so shaped and arranged as to surround and enclose the said commutator as closely as possible, and being provided with window-forming apertures so located as to fit to the position of the brushes, substantially as, and for the purpose, set forth.

In testimony whereof I have hereunto affixed my signature.

HERMANN STEINHART.